US007617408B2

(12) United States Patent
Frazier et al.

(10) Patent No.: US 7,617,408 B2
(45) Date of Patent: Nov. 10, 2009

(54) SYSTEM AND METHOD FOR PROVIDING ACCURATE TIME GENERATION IN A COMPUTING DEVICE OF A POWER SYSTEM

(75) Inventors: Nicholas R. Frazier, Pullman, WA (US); Daniel L. Ransom, Pullman, WA (US); Cody W. Tews, Pullman, WA (US)

(73) Assignee: Schweitzer Engineering Labortories, Inc., Pullman, WA (US)

( * ) Notice: Subject to any disclaimer, the term of this patent is extended or adjusted under 35 U.S.C. 154(b) by 454 days.

(21) Appl. No.: 11/353,714

(22) Filed: Feb. 13, 2006

(65) Prior Publication Data

US 2007/0300094 A1 Dec. 27, 2007

(51) Int. Cl.
*G06F 1/12* (2006.01)
(52) U.S. Cl. .................... 713/400; 370/508; 375/358
(58) Field of Classification Search .............. 713/400; 370/508; 375/358
See application file for complete search history.

(56) References Cited

U.S. PATENT DOCUMENTS

| 4,768,178 | A | 8/1988 | Conklin et al. | |
|---|---|---|---|---|
| 5,363,377 | A | 11/1994 | Sharpe | |
| 6,847,691 | B2 | 1/2005 | Torikoshi et al. | |
| 7,239,581 | B2 * | 7/2007 | Delgado et al. | 368/10 |
| 7,283,568 | B2 * | 10/2007 | Robie et al. | 370/503 |
| 2002/0069299 | A1 | 6/2002 | Rosener et al. | |

FOREIGN PATENT DOCUMENTS

| JP | 2001221874 A | 8/2001 |
|---|---|---|
| JP | 2001228271 A | 8/2001 |

OTHER PUBLICATIONS

Mills, D.L. Experiments in network clock synchronization. DARPA Network Working Group Report RFC-957, M/A-COM Linkabit, Sep. 1985.*
wikipedia.org, "UTF-8" definition.
whatis.com, "ASCII" definition.
whatis.com, "ISO date format" definition.
whatis.com, "Coordinated Universal Time" definition.
whatis.com, "latency" definition.

* cited by examiner

*Primary Examiner*—Chun Cao
*Assistant Examiner*—Albert Wang
(74) *Attorney, Agent, or Firm*—Eugene M. Cummings, P.C.

(57) ABSTRACT

A system and method provides accurate time generation in a computing device that includes a computing device clock and a microprocessor. The method includes determining a total system latency based on a delay incurred between issuance of a first command by the microprocessor and receipt of a first time-data signal by the microprocessor. The first time-data signal is representative of a master clock output of a master clock device at a first time. The method also includes deriving an accurate time from a second time-data signal. The second time-data signal is representative of the master clock output at a second time known by the microprocessor. The method further includes adjusting the accurate time based on a percentage of the total system latency to form a latency adjusted time, and applying the latency adjusted time to the computing device clock to synchronize the computing device clock to the master clock output.

54 Claims, 6 Drawing Sheets

SYSTEM AND METHOD FOR PROVIDING ACCURATE TIME GENERATION IN A COMPUTING DEVICE OF A POWER SYSTEM

CROSS-REFERENCE TO RELATED APPLICATIONS

None

BACKGROUND OF THE INVENTION

The present invention generally relates to accurate time generation, and more specifically, to a system and method for providing accurate time generation in a computing device of a power system.

Electric utility systems or power systems are designed to generate, transmit and distribute electrical energy to loads via a variety of power system elements such as electrical generators, power transformers, power transmission lines, distribution lines, buses and capacitors, to name a few. As a result, power systems are typically monitored and protected using a number of different types of intelligent electronic device(s) (IED) such as protective relays, remote terminal units, power meters, and the like.

For example, protective schemes in conjunction with the protective devices (e.g., protective relays, surge protectors, arc gaps and associated circuit breakers and reclosers) monitor and protect the power system elements from abnormal conditions such as electrical short circuits, overloads, power swings, pole slips, frequency excursions, voltage fluctuations, and the like. During operation, such protective devices act to isolate, or disconnect portions of the power system or power system element(s) (e.g., a generator, transformers, buses, motors, etc.) from the remainder of the power system upon detection of an abnormal condition or fault in one or more power system element(s).

In addition to power system elements and IEDs, power systems include computing devices (e.g., personal computers) to, among other things, monitor the IEDs and provide associated monitoring information to users such as power system operators, power system engineers, etc. Much of the monitoring information requires time-stamping based on accurate time generation. For example, a computing device may be programmed to build a sequence-of-events record of separate events collected from IEDs located in a particular substation. The sequence-of-events record may then be used by power system personnel to reconstruct events leading to a power outage associated with the substation. In that case, knowledge of the exact time of each event is critical.

Internal computing device clocks such as PC clocks are used to time-stamp each event. Unfortunately, computing device clocks tend to be the subject of a certain amount of error or "drift" over time, as well as being subject to power outages and fluctuations. As a result, they may lose their accuracy and may therefore be unable to provide accurate time-stamping for events occurring in the power system.

SUMMARY OF THE INVENTION

In general, a system and a method provide accurate time generation in a computing device in a power system.

In accordance with an aspect of the invention, a system provides accurate time generation in a computing device. The system includes the computing device including a computing device clock and a first microprocessor operatively coupled to the computing device clock. The system also includes a master clock device operatively coupled to the computing device via a communications link. The master clock device includes a master clock and a second microprocessor operatively coupled to the master clock. The master clock is configured to provide a master clock output. The first microprocessor is configured to synchronize a time of the computing device clock to the master clock output to provide the accurate time generation in the computing device using a latency adjusted time derived from a total system latency of the system.

The total system latency includes a sum of the system delays or latency contributions. In an embodiment, the total system latency includes a first latency contribution due to computing device operation at a first time, a second latency contribution due to communications link operation at a second time, a third contribution due to master clock device operation at a third time, a fourth latency contribution due to master clock operation at a fourth time, a fifth latency contribution due to communications link operation at a fifth time and a sixth latency contribution due to computing device operation at a sixth time. More or less latency contributions are possible, depending on the system design.

In accordance with yet another aspect of the invention, a method provides accurate time generation in a computing device that includes a computing device clock and a microprocessor. The method includes determining a total system latency based on a delay incurred between issuance of a first command by the microprocessor and receipt of a first time-data signal by the microprocessor. The first time-data signal is representative of a master clock output of a master clock device at a first time. The method also includes deriving an accurate time from a second time-data signal. The second time-data signal is representative of the master clock output at a second time, where the second time is known by the microprocessor. The method further includes adjusting the accurate time based on a percentage of the total system latency to form a latency adjusted time, and applying the latency adjusted time to the computing device clock to synchronize a time of the computing device clock to the master clock output. The percentage of the total system latency is preferably equal to one-half of the total system latency, or the travel time beginning with issuance of the time-data signal and ending with receipt of the first time-data signal by the microprocessor.

In accordance with a further aspect of the invention, a method provides accurate time generation in a computing device of a power system. The computing device includes a computing device clock and a microprocessor. The method includes (a) receiving a first plurality of time-data signals where receipt of each of the first plurality of time-data signals corresponds to issuance and transmission of a respective loop-back command of a plurality of loop-back commands. The method also includes (b) determining an averaged total system latency based on an averaged delay incurred between issuance of each of the plurality of loop-back commands and receipt of each of the corresponding first plurality of time-data signals, and (c) receiving a second plurality of time-data signals. Each of the second plurality of time-data signals is transmitted at a different known time instant in response to receipt of at least one zero-crossing synchronized command. The method further includes (d) deriving an accurate time from at least one of the second plurality of time-data signals, (e) adjusting the accurate time based on a percentage of the averaged total system latency to form a latency adjusted time, and (f) applying the latency adjusted time to the computing device clock to synchronize a time of the computing device clock to a master clock output of a master clock device.

It should be understood that the present invention includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE PREFERRED EMBODIMENTS

Figure 1:
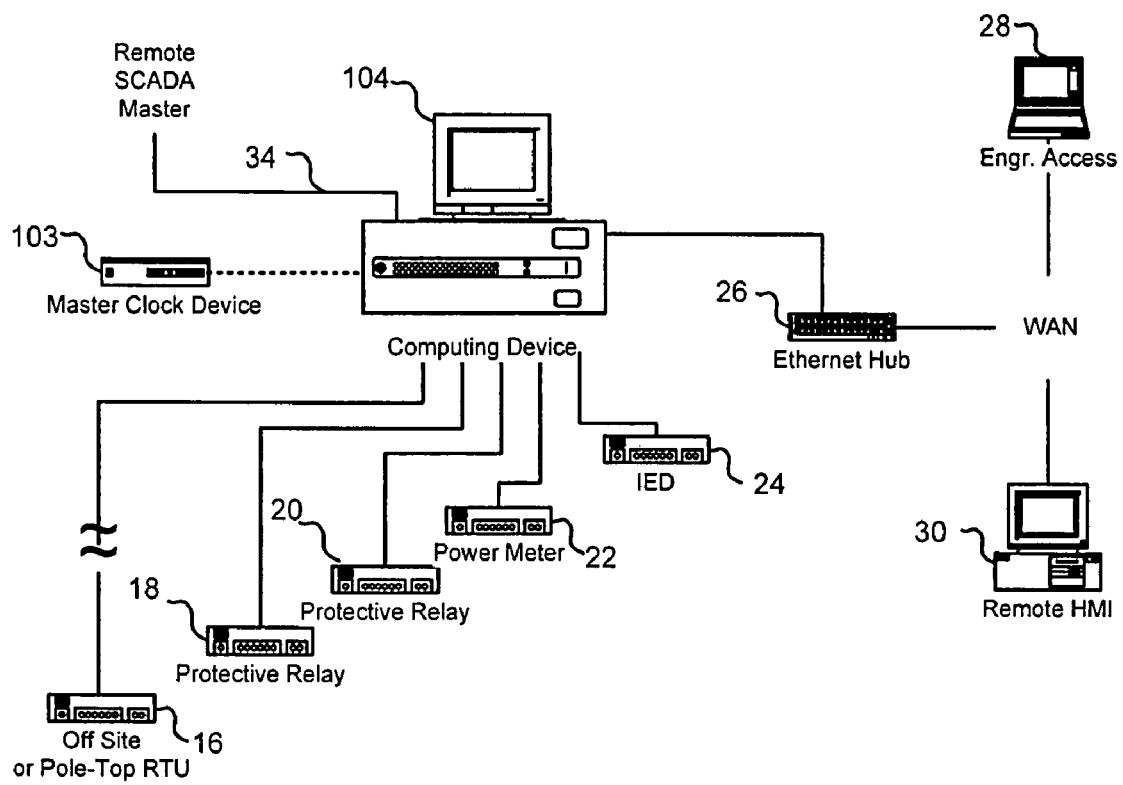
FIG. 1 is a diagram of a portion of a monitoring scheme for a power system substation, according to an embodiment of the invention.

FIG. 1 is a diagram 10 of a portion of a monitoring scheme for a power system substation, according to an embodiment of the invention. As noted above, in addition to power system elements and IEDs, power systems include computing devices (e.g., personal computers) to monitor the IEDs and provide associated monitoring information to users such as power system operator, power system engineers, etc.

Referring to FIG. 1, the diagram 10 includes a computing device 104 (e.g., a microprocessor-based) communicatively coupled to a master clock device 103 via a communications link 114. The computing device 104 is configured to monitor a number of IEDs including an off-site remote terminal unit 16, a first and second protective relay 18 and 20, a power meter 22 and another IED 24. A link 34 to a remote supervisory control and data acquisition (SCADA) system master computer (not separately illustrated) is also provided to the computing device 104. A laptop 28 is operatively coupled to the computing device 104 via an Ethernet hub 26 and a wide area network (WAN) to enable a power system operator or engineer to access files, sequence-of-events reports and the like from the computing device 104. Another computer 30 also operatively coupled to the computing device 104 via an Ethernet hub 26 and the WAN provide a human machine interface for backup power-system control and monitoring.

Figure 2:
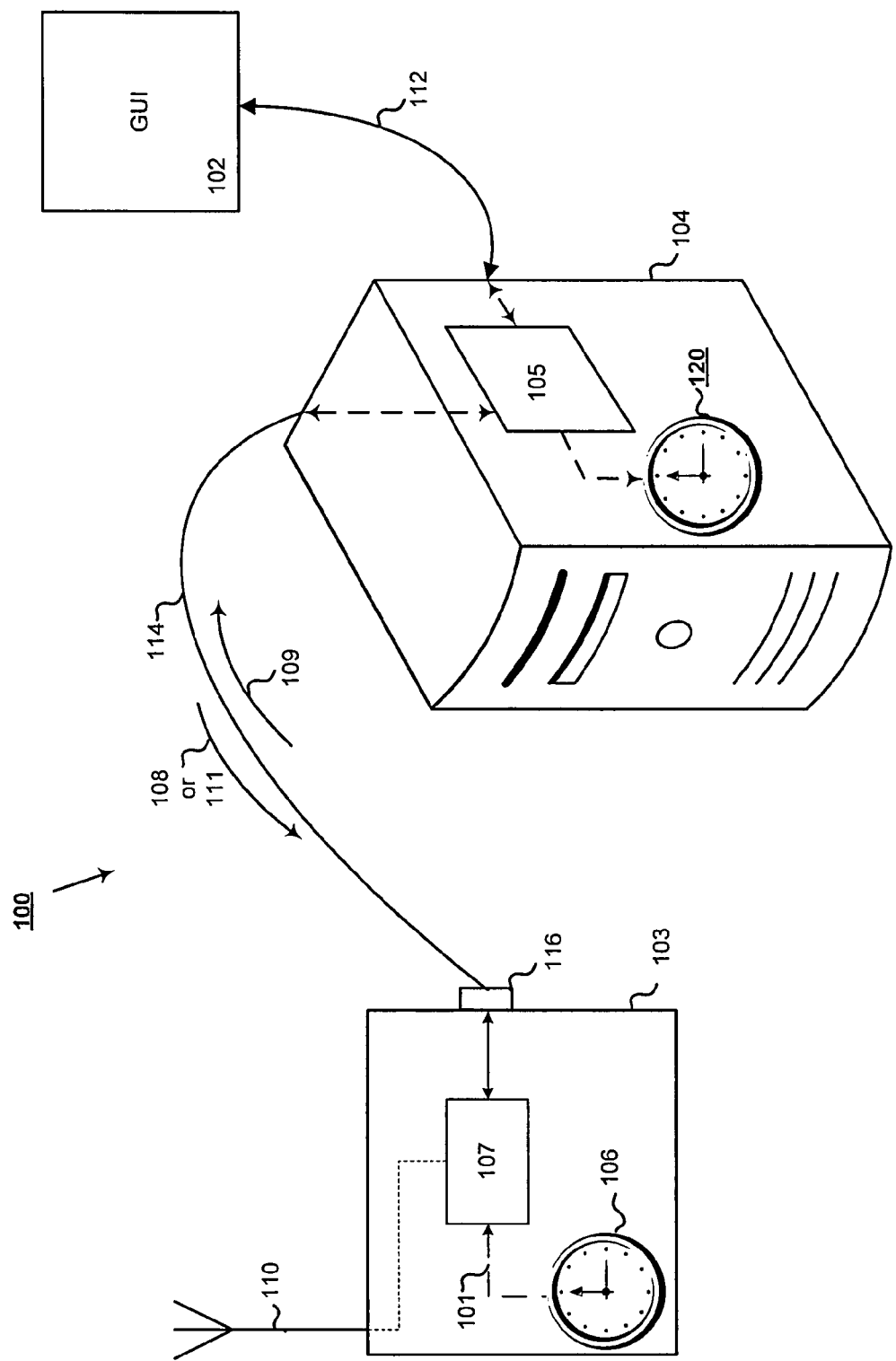
FIG. 2 is a system to synchronize a computing device to a master clock of FIG. 1 in order to provide accurate time generation in the computing device, according to an embodiment of the invention.

FIG. 2 is a system 100 to synchronize the computing device 104 (i.e., a microprocessor-based device) to a master clock 106 of a master clock device 103 for purposes of providing accurate time generation in the computing device 104, according to an embodiment of the invention. In general, the accurate time generation is based on (A) average latency calculations performed by the computing device 104 using loop-back command interrogation (e.g., a coordinated universal time (UTC) command interrogation) of the master clock device 103, (B) forming a latency adjusted time by adjusting one or more time time-data signals received from the master clock device 103 using the average latency calculations, and (C) application of the latency adjusted time to a computing device clock 120 to provide the accurate time generation in the computing device 104. The received time-data signals are derived from a master clock output 101 and are transmitted by the master clock device 103 on the zero-crossing mark (at the beginning) of a second in response to receipt of one or more zero-crossing synchronized commands 111 (e.g., a UTC n commands) from the computing device 104. Thus, the latency adjusted time is used to synchronize the computing device clock 120 to the master clock 106.

Referring to FIG. 2, the master clock device 103 includes a microprocessor 107 operatively coupled to an antenna 110, the master clock 106 and the communications link 114. The master clock 106 is configured to provide the master clock output 101. Accurate time indications received via the antenna 110 from, for example, satellite position signals are used as a basis of the master clock output 101. Alternatively, the master clock device 103 may include a microprocessor 107 operatively coupled to the master clock 106 and the communications link 114.

Although preferably configured as a Navigation Signal Timing and Ranging Global Positioning System (GPS)-based clock, the master clock device 103 may be configured as one of any number of precision electronic time sources such as, for example, a long-wave broadcast station (WWVB or similar). Further, in addition to GPS signals, the accurate time indications provided to the master clock device 103 may also include microwave amplification by stimulated emission of radiation (MASER) signals, light amplification by stimulated emission of radiation (LASER) signals, cesium-based signals or rubidium-based signals, to name a few.

The computing device 104 includes a microprocessor 105 and a computing device clock 120 operatively coupled to the microprocessor 105. Although shown separate from the microprocessor 105, the computing device clock 120 may be enabled as a sequence of computer implemented acts or a program module running via the microprocessor 105. A graphical user interface GUI 102 is coupled to the computing device 104 to, among other things, enable a user to select the times (e.g., every minute, hourly, daily) for providing or updating the accurate time generation to the computing device 104. Although configured as a standard computer, the computing device 104 may be configured as one of any number of microprocessor based devices, such as for example, a digital fault recorder, phasor measurement unit, programmable logic unit, or remote terminal unit.

The communications link 114 operatively coupling the master clock device 103 to the computing device 104 may be one of any number of suitable types of communications links configured to transmit binary data including, for example, a serial link, a fiber channel link, an Ethernet link, a wireless local area network (LAN) link, or a radio frequency (RF) link, depending on the application. Accordingly, the communications link 114 may transmit serial binary data, packetized binary date, or encoded binary data, to name a few. Although not separately illustrated, the communications link 114 may further include a network portion.

A communications port 116 provides an interface between the master clock device 103 and the communications link 114. Depending on the type of master clock device 103 utilized, the communications port 116 may be configured as a EIA-232 interface, a universal serial bus (USB), a transmitter/receiver, a wireless LAN interface, etc., depending on the requirements of the communications link 114.

In the illustrated example, the communications link 114 is configured as a serial link for transmission of binary signals. Each of the binary signals from the master clock device 103 is preferably formatted as a time-data signal 109 in an American Standard Code for Informational Exchange (ASCII) format or in an 8-bit Unicode Transformation format (UTF-8); however, other suitable formats may be utilized. The time-data signal 109 includes a numeric calendar date, preferably expressed in an International Organization for Standardization (ISO) data format (e.g., 2006-01-11T14:36:45-08:00 per ISO 8601), however other suitable data formats may be used. The binary signals transmitted from the computing device 104 are preferably formatted UTC commands (e.g., the loop-back command 108) and UTC n commands (e.g., the zero-crossing synchronized commands 111).

Figure 3:
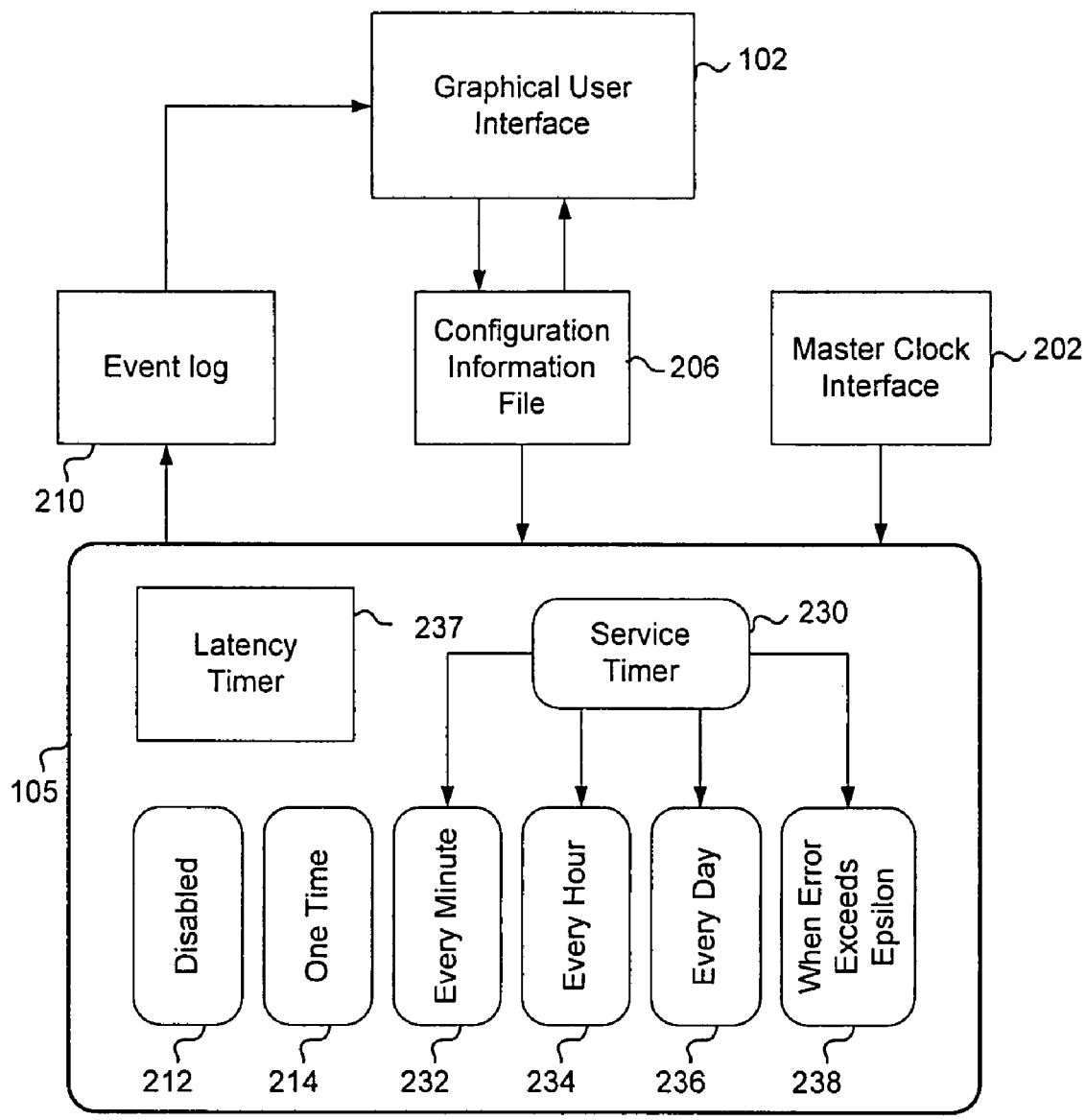
FIG. 3 is a partial functional block diagram of the computing device of FIG. 1, including the user interface, according to an embodiment of the invention.

FIG. 3 is a partial functional block diagram of the computing device 104, including the GUI 102 and the microprocessor 105, according to an embodiment of the invention. Although illustrated as functional blocks, it should be understood that computing device functionality is provided via the microprocessor 105 executing software and/or program modules such as, for example, the method for providing accurate time generation in the computing device 104 illustrated in FIG. 4 below.

The computing device 104 includes the GUI 102 to enable user selection of synchronization settings that are subsequently included a configuration information file 206. The configuration file 206 is used by the microprocessor 105 to establish the interval period or frequency of the synchronization of the computing device clock 120 to the master clock output 101. A service timer 230 is used to indicate the interval period of computing device clock synchronization.

In an embodiment, the user selected synchronization settings include a Disabled setting 212, a One Time setting 214, an Every Minute setting 232, an Every Hour setting 234, an Every Day setting 236, and a When Error Exceeds Epsilon setting 238. The service timer 230 may be used when one of the Every Minute setting 232, an Every Hour setting 234, an Every Day setting 236, and a When Error Exceeds Epsilon setting 238 is selected. Other user selected synchronization parameters may also be utilized.

When selected, the Disabled setting 212 disables execution of the method for providing accurate time generation in the computing device 104. When selected, the One Time setting 214 enables execution of the method for providing accurate time generation in the computing device 104, and upon successful completion, the method for providing accurate time generation in the computing device 104 is disabled.

When selected, each of the Every Minute setting 232, the Every Hour setting 234, the Every Day setting 236 enables the method for providing accurate time generation in the computing device 104 to be executed at its corresponding interval period. The service timer 230 may be used to indicate the interval period identified via the user selected synchronized settings included in the configuration information file. For example, for cases where the Every Minute setting 232 or the Every Hour setting 234 is selected, at the beginning of an interval period, a communications port of the computing device 104 is opened, a latency timer 237 is started and then stopped, a total system latency 132 such as in FIG. 5 (or an averaged total system latency) is calculated based upon loop-back command 108 interrogation during latency timer operation, one or more time-data signals 109 are received from the master clock 106 in response to zero-crossing synchronized commands 111, a percentage of the total system latency (e.g., 50% of the total system latency) is added to at least one of the time-data signals 109 to form latency adjusted time, and the latency adjusted time is applied to the computing device clock 120 to provide the accurate time generation.

In cases where the Every Day setting is selected, upon time-out of the service timer 230, the current date as reported by the computing device 104 is compared to the date of the previous synchronization of the computing device clock 120 to the master clock output 101. If the current date differs from the date of the previous synchronization, the computing device 104 will calculate the total system latency 132 using loop-back command 108 interrogation of the master clock device 103, adjust a time-data signal 109 transmitted from the master clock device 103 based on the a percentage of the total system latency 132 to form a latency adjusted time, and apply the latency adjusted time to the computing device clock 120 to provide the accurate time generation.

In an embodiment, the communications pert of the computing device 104 is closed for the Every Hour setting 234 until time-out of the service timer 230 indicates the beginning of the next interval period. When the Every Day setting 236 is selected however, the serial port is closed until a difference is detected between the current date as reported by the computing device 104 and the date of the previous synchronization. Other implementations are also contemplated.

Although latency timer functionality is illustrated as latency timer 237, it should be understood that the latency timer 237 is an internal temporary "stopwatch" function of the microprocessor 105 used during the loop-back command interrogation. In an embodiment, the latency timer 237 may be started upon issuance of the loop-back command interrogation and stopped upon completion of the loop-back command interrogation. In another embodiment, the latency timer 237 is started, the loop-back command 108 is issued a hard-coded number of times (e.g., five times), the latency timer 237 is stopped after receipt of a last time-data signal 109 and then the total system latency 132 is calculated based on the elapsed time indicated by the latency timer 237.

When selected, the When Error Exceeds Epsilon setting 238 enables the method for providing accurate time generation in a computing device 104 to be executed every minute when the absolute value of a time of the computing device clock 120 minus a time of the master clock 106 exceeds a preselected threshold value (i.e., computing device time–master clock time>threshold value). Other implementations are possible for the setting 128.

In operation, an event log 210 generated by the microprocessor 105 provides an indication to the user of failures to communicate with the master clock device 103, and a master clock interface 202 enables transmission of loop-back and zero-crossing synchronized commands 111 to the master clock device 103, and receipt of time-data signals 109 from master clock device 103 during execution of the method for providing accurate time generation in the computing device 104.

As discussed above, the method for providing accurate time generation in the computing device 104 includes total system latency calculations performed by the computing device 104 using loop-back command interrogation of the master clock device 103, and adjustment by the microprocessor 105 of time-data signals 109 from the master clock device 103 using a percentage or portion of the (averaged) total system latency 132 (e.g., 50 percent of the average system latency representing latency incurred "one way").

Figure 4:
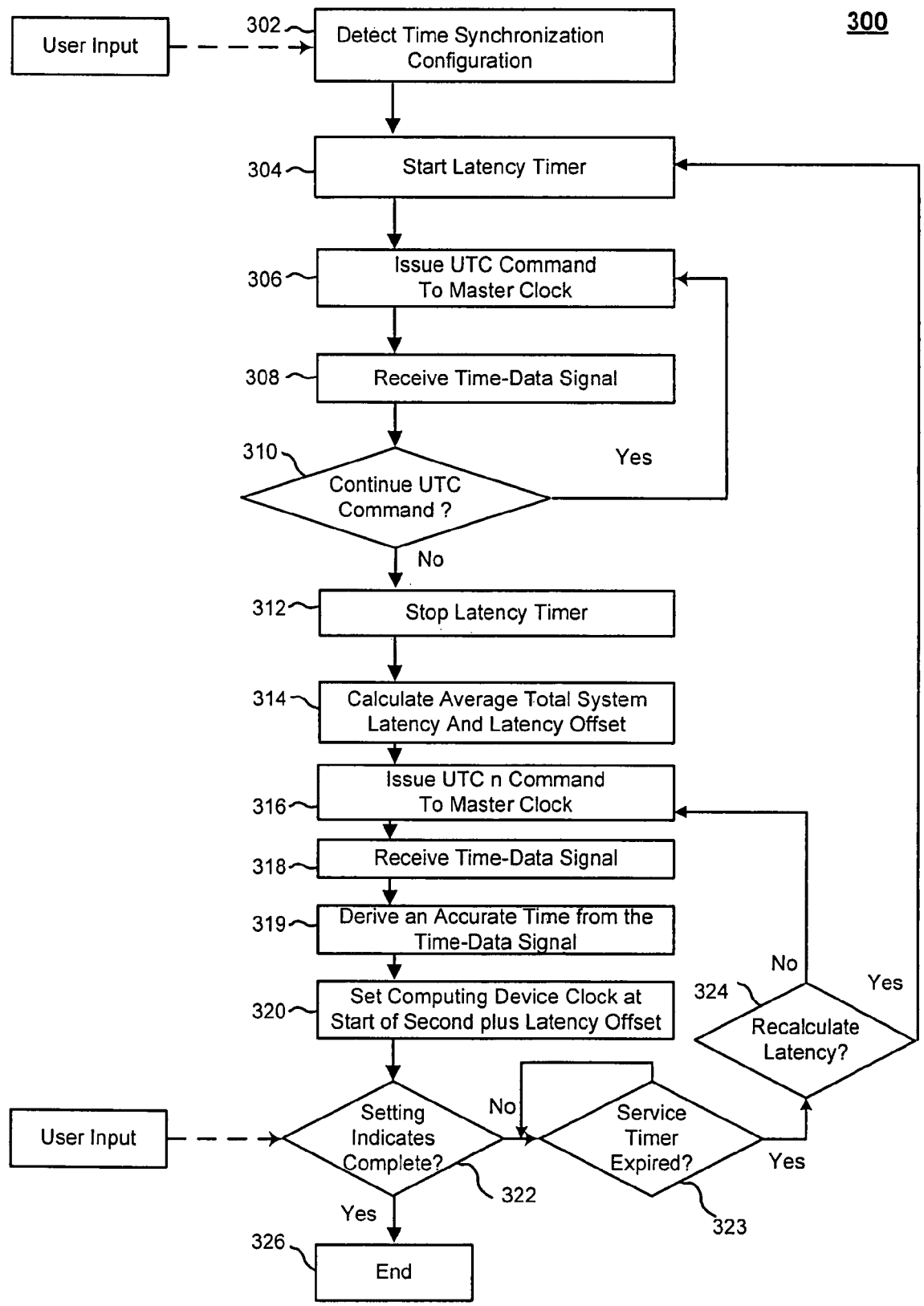
FIG. 4 is a flow chart of a method for providing accurate time generation to the computing device of FIG. 1, according to an embodiment of the invention.

FIG. 4 is a flow chart of a method 300 for providing accurate time generation in the computing device 104, according to an embodiment of the invention. As discussed in connection with FIG. 3, the method 300 is enabled when user selection of synchronization settings is complete and a resulting configuration information file is available to the microprocessor 105 (step 302). Such settings preferably include interval periods at which the computing device clock time is synchronized to the master clock output 101. In some cases, the synchronization may include calculating the total system latency 132 and applying a percentage of the total system latency 132 to a received time-data signal 109, or applying a previously calculated percentage of the total system latency 132 the received time-data signal 109.

Next, at the beginning of an interval period (e.g., top of every hour), the latency timer 237 is started (step 304) and a series of loop-back commands 108 are caused to be transmitted by the microprocessor 105. The loop-back commands 108 are transmitted (via operation of a universal asynchronous receiver-transmitter, not separately illustrated) to the master clock device 103 for receipt by the microprocessor 107. Upon receipt of each of the loop-back commands 108, the microprocessor 107 causes a time-data signal 109 to be transmitted to the computing device 104.

For each loop-back command 108 sent to the master clock device 103, the microprocessor 105 receives a corresponding time-data signal 109 from the master clock device 103. Even though each corresponding time-data signal 109 includes the numeric calendar date, the microprocessor 105 disregards the numeric calendar date content during the loop-back command interrogation and instead utilizes receipt time of the time-data signal 109 to establish a "round-trip travel time" between issuance of a loop-back command 108 and receipt of the corresponding time-data signal 109 by the microprocessor 105. Upon completion of loop-back command interrogation (step 310), the microprocessor 105 causes the latency timer 237 to terminate (step 312) and then calculates an averaged total system latency aa and a clock-to-device latency offset aa/2 as described in connection with FIG. 5 (step 314). In an embodiment, the microprocessor 105 may cause the corresponding time-data signals 109 to be stored in a memory location during the loop-back command interrogation.

Figure 5:
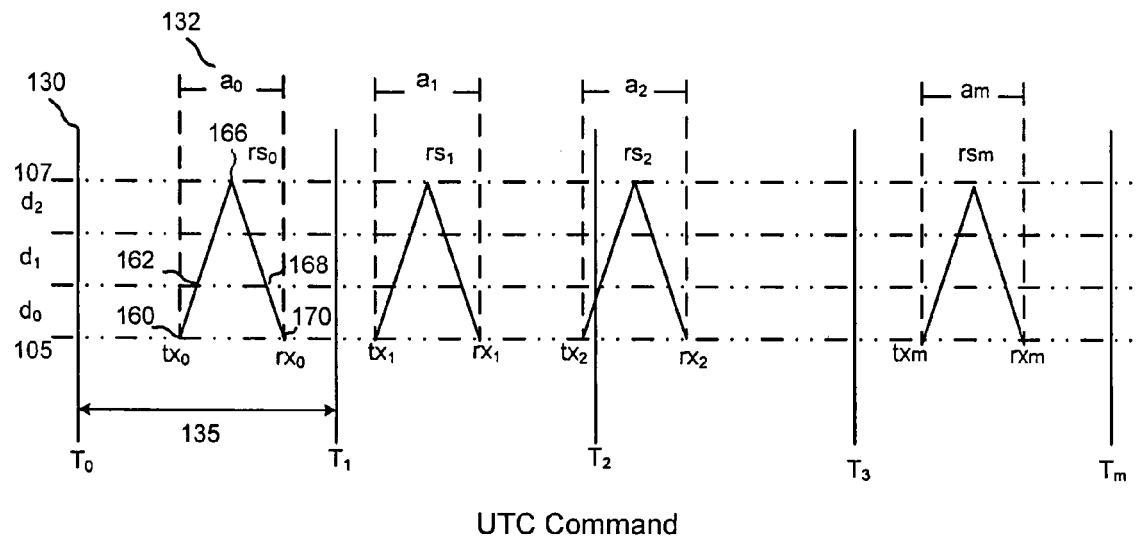
FIG. 5 is a first timing diagram illustrating loop-back command interrogation including transmission of a number of loop-back commands and receipt of a corresponding number of time-data signals by the computing device of FIG. 1, according to an embodiment of the invention.

FIG. 5 is a first timing diagram 121 illustrating the loop-back command interrogation, including transmission of a number of loop-back commands 108 and receipt of a corresponding number of time-data signals 109 by the microprocessor 105, according to an embodiment of the invention. Referring to FIG. 5, each of the vertical lines 130 labeled $T_o$, $T_1, T_2 \ldots T_m$ represents the beginning of a start-of-the-fixed-time interval, for example, the beginning of a one second time interval where $T_o=0$ seconds, $T_1=1$ second, $T_2=2$ seconds and so on until $T_m=m$ seconds. During the time period between $T_o=0$ seconds and $T_m=m$ seconds, the latency clock is running while the computing device 104 issues/transmits a number of loop-back commands 108 for the purpose of determining corresponding total system latencies 132. One total system latency begins accrual upon issuance of each individual loop-back command 108 and receipt of a corresponding response from the master clock device 103; in this case, receipt of a corresponding time-data signal 109 from the master clock device 103.

The latency timer 237 is started just prior to issuance of the first loop-back command 108, caused to be issued by the microprocessor 105 for transmission to the master clock device 103 at time instant $tx_0$. A second loop-back command 108 is caused to be issued at a time instant $tx_1$, a third loop-back command 108 is caused to be issued at a time instant $tx_2$, and so on until the final loop-back command 108 is caused to be issued for transmission to the master clock device 103 at a time instant $tx_m$. It should be understood by one skilled in the art, that a software application or equivalent, executable by the microprocessor 105 utilizing the user selected synchronization settings, is determinative of when loop-back commands 108 are caused to be issued. It should also be understood that the beginning of the start-of-the-fixed-time-intervals are illustrated as reference points only with respect to the loop-back commands 108.

The first loop-back command 108 is caused to be issued at the time instant $tx_0$ denoted as 160 in FIG. 5, and a time instant of entry of the first loop-back command 108 in the communications link 114 is denoted as 162. Thus, there is a time delay between issuance of the first loop-back command 108 and entry of the first loop-back command 108 in the communications link 114 for transmission to the master clock device 103. Additional time delays are also incurred as the first loop-back command 108 travels to the microprocessor 107 of the master clock device 103. The sum of these delays is commonly referred to as the "total system latency" 132, or how much time it takes for a command to get from one designated point to another, and back again; in this case, from the microprocessor 105 to the microprocessor 107 and back to the microprocessor 105.

For purposes of discussion, total system latency 132 includes a sum of a first latency contribution or a computing device latency contribution $d_o$ due to computing device operation at a first time, a second latency contribution or a communications link contribution $d_1$ due to communications link operation at a second time, a third latency contribution or a master clock latency $d_2$ due to master clock device operation at a third time, a fourth latency contribution $d_2$ due to master clock operation at a fourth time, a fifth latency contribution $d_1$ due to communications link operation at a fifth time and a sixth latency contribution $d_o$ due to computing device operation at a sixth time.

Although illustrated as equal segments in FIG. 5, it should be understood that first latency contribution $d_o$ due to computing device operation at a first time and the sixth latency contribution $d_o$ due to computing device operation at a sixth time are not necessarily equal. Similarly, the second latency contribution $d_1$ due to communications link operation at a second time and the fifth latency contribution $d_1$ due to communications link operation at a fifth time are not necessarily equal, and the third latency contribution $d_2$ due to master clock device operation at a third time and the fourth latency contribution $d_2$ due to master clock operation at a fourth time are not necessarily equal.

The computing device latency contribution $d_o$ may include delays caused by the operating system software interface, the operating system scheduler, the operating system burden, the operating system hardware interface, interrupt blocking, communication hardware delays such as those due to the hardware buffer, transmission and receive synchronization, and data packetization. The communications link latency contribution $d_1$ may include delays caused by the cable (or other medium), protocol packetization, a protocol acknowledgement sequence, a hardware repeater (such as a network switch/router), and noise. The master clock latency contribution $d_2$ may include delays caused by communication hardware (as above in the pc latency), software to hardware drivers, interrupt blocking, scheduler granularity, and data processing.

As illustrated in FIG. 5, the travel path of the first loop-back command through the communications link 114 to the microprocessor 107 includes the computing device latency contribution $d_o$ (i.e., the first latency contribution due to computing device operation at a first time), the communications link latency contribution $d_1$ (i.e. the second latency contribution due to communications link-operation at a second time), and the master clock latency contribution $d_2$ (i.e., the third contribution due to master clock device operation at a third time). Upon receipt of the first loop-back command 108, the microprocessor 107 causes a substantially immediate response with a first time-data signal 109 at a time instant $rs_0$ denoted as time instant 166.

The first time-data signal 109 caused to be issued and transmitted by the microprocessor 107 traverses a "reverse" travel path through master clock device 103, the communications link 114 and the computing device 104 to the microprocessor 105. The travel path includes the master clock latency contribution $d_2$ (i.e., the fourth latency contribution due to master clock operation at a fourth time), the communications link latency contribution $d_1$ (i.e., the fifth latency contribution due to communications link operation at a fifth time), and finally the computing device latency contribution $d_o$ (i.e., the sixth latency contribution due to computing device operation at a sixth time). As a result, the travel path of the first time-data signal 109 through the communications link 114 ends at a time instant denoted as 168, and the travel path of the first time-data signal 109 through to the microprocessor 105 at a time instant $rx_0$, denoted as 170. Similarly, in response to respective loop-back commands 108 received by the microprocessor 107, a second time-data signal 109 is received by the microprocessor 105 at time instant $rx_1$, a third time-data signal 109 is received by the microprocessor 105 at time instant $rx_2$ and so on until the final time-data signal 109 is received by the microprocessor 105 at time instant $rx_m$. Immediately after receipt of the final time-data signal 109, the microprocessor 105 causes the latency timer 237 to stop.

Although the latency timer 237 is configured to start immediately prior to (e.g., a few milliseconds prior to) issuance of the first loop-back command and stop immediately after receipt of the last time-data signal by the microprocessor 105, other timing schemes are contemplated. For example, the latency timer 237 may be started in conjunction with issuance of the first loop-back command, and may be stopped in conjunction with receipt of the last time-data signal by the microprocessor 105.

A first total system latency $a_0$, denoted as 132 in FIG. 5, accrues during the round trip transmission including transmission of the first loop-back command 108 and receipt of the first time-data signal 109. Similarly, a second total system latency $a_1$, accrues during transmission of the second loop-back command 108 and the second time-data signal 109, a third total system latency $a_2$, accrues during transmission of the third loop-back command 108 and the third time-data signal 109, and so on until the final total system latency $a_m$, accrues during transmission of the final loop-back command 108 and the final time-data signal 109.

The averaged total system latency aa can be calculated based on a sum of the total system latencies $a_0, a_1, a_2, \ldots a_m$. Assuming symmetric data latency, the master-clock-to-computing-device latency (clock-to-device latency offset), or travel time from the microprocessor 107 to the microprocessor 105, may be expressed as aa/2. Thus, based on a number of measured total system latencies, the microprocessor 105 calculates the clock-to-device latency offset. It is contemplated that the microprocessor 105 may also calculate the clock-to-device latency based on only one measured total system latency rather than an average of a number of measured total system latencies. Further, the time of receipt of the time-data signal by the microprocessor 105 includes a register-change delay. That is, the clock-to-device latency offset includes any delay caused by calculations and writing to memory (registers) of the microprocessor 105.

Figure 6:
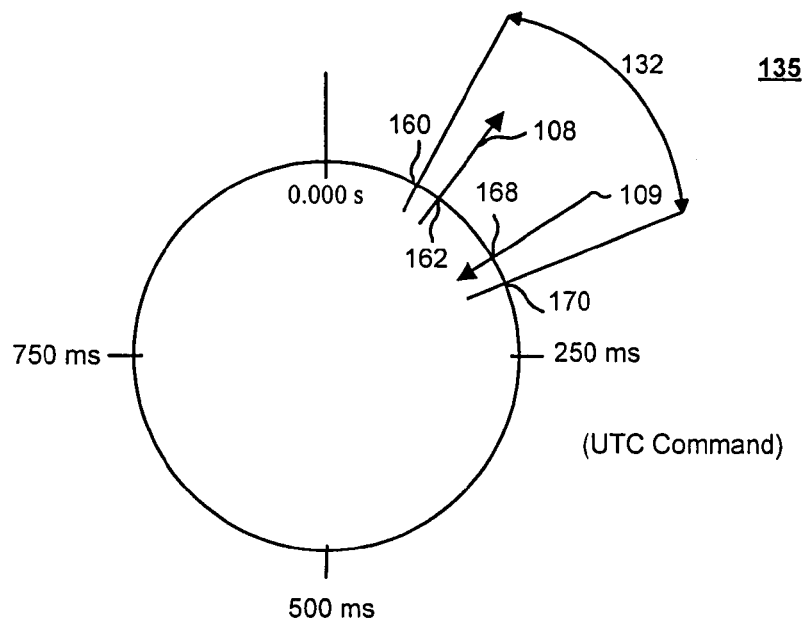
FIG. 6 is a one-second timing chart illustrating the total latency incurred during transmission of one loop-back command and receipt of one corresponding time-data signal by the computing device of FIG. 1, according to an embodiment of the invention.

A portion of the timing diagram 121 may be illustrated in another form to more clearly depict the total system latency. FIG. 6 is a one-second timing interval 135 illustrating the total system latency 132 incurred during transmission of one loop-back command and receipt of one corresponding time-data signal by the microprocessor 105 of the computing device 104, according to an embodiment of the invention. Transmission of the corresponding time-data signal 109 in response to receipt of the loop-back command 108 may occur at any time after the beginning of time interval denoted as $T_0$. For purposes of discussion, the first one-second timing interval 135 illustrates the first loop-back command 108 and the first time-data signal 109 occurring during the one-second timer interval between $T_0$ and $T_1$ (see, FIG. 5).

Referring to FIG. 6, some time after the beginning of the time interval $T_0$ at the time instant $tx_0$ 160 the first loop-back command 108 is caused to be issued and transmitted by the microprocessor 105. As a result of a first delay or the first latency contribution due to computing device operation at a first time), the first loop-back command 108 enters the communications link 114 at the time instant 162 for transmission to the master clock device 103. After a second delay resulting from the second latency contribution due to communications link operation at a second time, the third latency contribution due to master clock device operation at a third time, the fourth latency contribution due to master clock operation at a fourth time, and the fifth latency contribution due to communications link operation at a fifth time, a first time-data signal 109 exits the communications link 114 at the time instant 168. After a third delay resulting from the sixth latency contribution due to computing device operation at a sixth time the microprocessor 105 receives the first time-data signal 109 at the time instant 170. Thus, the time elapsed between the time instant $tx_0$ 160 and the time instant $rx_0$ represents the total system latency 132.

Referring again to FIG. 4, in general, after calculation of the averaged total system latency aa based on an average of the total system latencies $a_0, a_1, a_2, \ldots a_m$, and calculation of the clock-to-device latency offset aa/2, the microprocessor 105 issues one or more zero-crossing synchronized commands 111 (e.g., UTC n command(s)) to the master clock device 103 (step 316). In response, the microprocessor 105 receives at least one time-data-signal 109 from the microprocessor 107 (step 318), to which it can add the clock-to-device latency offset aa/2 to derive a latency adjusted time for application to the computing device clock 120 (step 320) for synchronization purposes.

Figure 7:
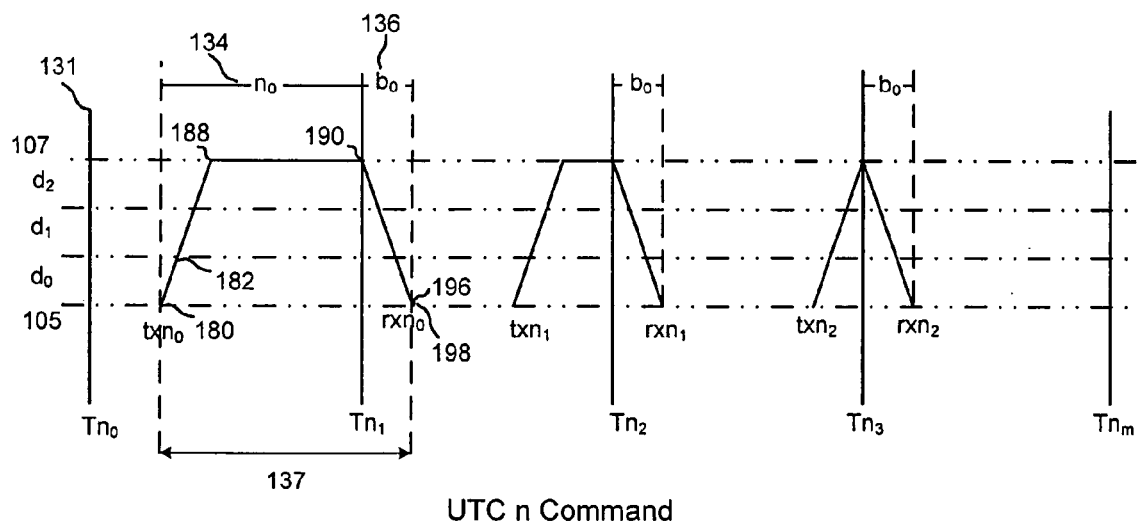
FIG. 7 is a second timing diagram illustrating transmission of a number of zero-crossing synchronized commands and receipt of a corresponding number of time-data signals by the computing device of FIG. 1, according to an embodiment of the invention.

More specifically, FIG. 7 is a second timing diagram 123 illustrating transmission of zero-crossing synchronized command(s) and receipt of a corresponding number of time-data signals 109 by the computing device 104, according to an embodiment of the invention. Although the illustrated example of FIG. 7 depicts three separate zero-crossing synchronized commands 111, each respectively issued at time instants $txn_0$, $txn_1$, $txn_3$ to cause multiple time-data signal 109 responses, it should be understood that one zero-crossing synchronized command 111 issued at $txn_0$ may be used to cause one or more time-data signal 109 responses at sequential time instants occurring at the master clock sequential zero-crossings.

Like the timing diagram of FIG. 5, each of the vertical lines 131 labeled $Tn_0$, $Tn_1$, $Tn_2$ ... $Tn_m$ represent the beginning of a start-of-the-fixed-time interval; in this example, the start of a one-second time interval. Each of the start-of-the-fixed-time intervals provides a time reference for issuance of a time-data signal 109 by the master clock device 103, and represents a "zero crossing" point, or corresponding top (beginning) of the time interval.

In one embodiment, during the time period between $Tn_o=0$ seconds and $Tn_m=m$ seconds, the microprocessor 105 causes one zero-crossing synchronized command 111 to be issued and transmitted to the master clock device 103, indicating how many time-data signals 109 are to be transmitted to the computing device 104. For example, the microprocessor 105 causes one UTC n command to be issued and transmitted to the master clock device 103 where n is a number of time-data signals 109 the microprocessor 105 expects to receive from the master clock device 103. In this case, the multiple-time-data signals 109 from the master clock device 103 are used by the microprocessor 105 to reduce error caused by variability in the latency measurements.

In another embodiment, during the time period between $Tn_o=0$ seconds and $Tn_m=m$ seconds, the microprocessor 105 causes a number of zero-crossing synchronized commands 111 to be issued and transmitted, where one time-data signal 109 is transmitted from the master clock device 103 for each zero-crossing synchronized command 111 received from the computing device 104. It should be noted that when implementing either embodiment, the master clock device response of the time-data signals 109 issued on the zero-crossings is independent of the receipt time of the zero-crossing synchronized command(s) 111. Accordingly, sub-second differences in the zero-crossings of the master clock 106 and the computing device clock 120 do not affect the method for providing accurate time generation in the computing device 104.

Referring to FIG. 7, the first zero-crossing synchronized command 111 is caused to be issued by the microprocessor 105 for transmission to the master clock device 103 at a time instant $txn_0$ denoted as 180. Similarly, a second zero-crossing synchronized command 111 is caused to be issued at a time instant $txn_1$, and a third zero-crossing synchronized command 111 is caused to be issued for transmission to the master clock device 103 at a time instant $txn_2$. Although three zero-crossing synchronized commands 111 are issued and transmitted in FIG. 7, more or less zero-crossing synchronized commands 111 may be issued and transmitted, depending on implementation of the method for providing accurate time generation in the computing device 104.

Like the loop-back command 108, the first zero-crossing synchronized command 111 encounters delay during transmission from the microprocessor 105 to the microprocessor 107 due to the computing device latency contribution $d_o$, the communications link latency contribution $d_1$ and the master clock latency contribution $d_2$. Accordingly, a first zero-crossing synchronized command 111 issued at the time instant 180 begins transmission via the communications link 114 at a time instant 182 due to the computing device latency contribution $d_o$, with receipt of the first zero-crossing synchronized command 111 by the microprocessor 107 at a time instant 188 in FIG. 7 due to the communications link latency contribution $d_1$ and the master clock latency contribution $d_2$.

Unlike receipt of the loop-back command 108 where the microprocessor 107 substantially immediately responds with a time-data signal, receipt of the zero-crossing synchronized command 111 causes the microprocessor 107 to respond with transmission of a time-data signal 109 at the next zero-crossing (beginning of the next second). Thus, referring to FIG. 7, in response to receipt of the first zero-crossing synchronized command 111 from the computing device 104, the microprocessor 107 causes a first time-data signal 109 to be transmitted after some delay at a time instant 190; the time instant of the next zero-crossing $Tn_1$.

The first time-data signal 109 traverses a reverse travel path through the master clock device 103, the communications link 114 and the computing device 104 to the microprocessor 105 and therefore includes the master clock latency contribution $d_2$, the communications link latency contribution $d_1$, and the computing device latency contribution $d_o$. The travel path of the first time-data signal 109 to the microprocessor 105 ends at a time instant $rxn_0$ denoted as 196 with the computing device clock updated with an additional nominal delay at a time instant 198. The latency incurred beginning with issuance of and ending with receipt of the first time-data signal 109 by the microprocessor 105 is collectively denoted as an actual clock-to-device latency $b_0$ 136. Similarly, a travel path of a second time-data signal 109 to the microprocessor 105 begins at the next zero crossing $Tn_2$ and ends at a time instant $rxn_1$, and a travel path of a third time-data signal to the microprocessor 105 begins at the next zero crossing $Tn_3$ ends at a time instant $rxn_2$, with each having a corresponding actual clock-to-device latency.

Referring again to FIG. 4 receipt of one of the first, second or third time-data signal at respective time instants $rxn_0$, $rxn_1$, and $rxn_2$ (step 318) the microprocessor 105 derives an accurate time (e.g., 2006-01-11T14:36:45-08:00) from the data-time signal via parsing the time-data signal, and apply a local time zone calculation to form the accurate time (step 319). Next, the microprocessor 105 adds the clock-to-device latency adjustment aa/2 (e.g., 3 milliseconds) to the accurate time to calculate the latency adjusted time (e.g., 2006-01-11T14:36:48-08:00). In the illustrated example, the clock-to-device latency adjustment is equal to one-half of the total system latency.

The latency adjusted time is then used to set the computing device clock 120 at the time instant 198 (step 320). Accordingly, the computing device clock 120 is synchronized to the master clock output 101. It should be noted that although actual clock-to-device latency $b_0$ 136 is included in FIG. 6 for ease of discussion and illustration, it is the calculated clock-to-device latency adjustment aa/2 that is used for synchronization purposes.

Figure 8:
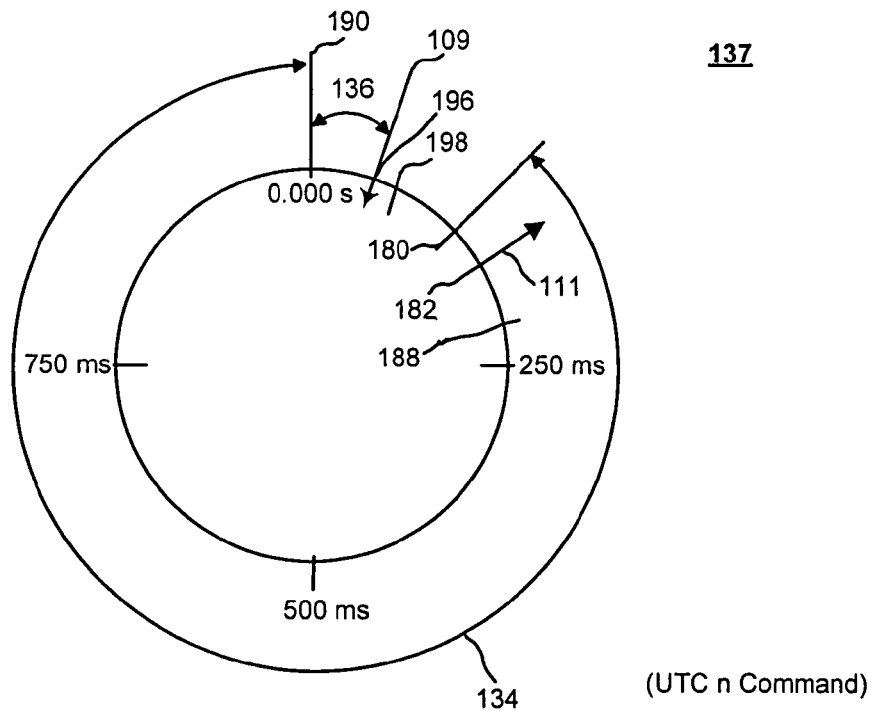
FIG. 8 is another one-second timing chart illustrating the timing relationship between one zero-crossing synchronized command and one corresponding time-data signal, according to an embodiment of the invention.

A portion of the timing diagram 123 may be illustrated in another form to more clearly depict the relationship between a zero-crossing synchronized command 111 and a corresponding time-data signal 109. FIG. 8 another one-second timing interval 137 illustrating the relationship between transmission of one zero-crossing synchronized command 111 and receipt of a corresponding time-data signal 109 by the microprocessor 105, according to an embodiment of the invention. As described above, transmission of a corresponding time-data signal 109 in response to receipt of the zero-crossing synchronized command(s) 111 occurs on a zero-crossing. For purposes of discussion, the first one-second timing interval 137 includes issuance/transmission of the first second zero-crossing synchronized command 111, receipt of the first time-data signal 109 by the microprocessor 105 and updating of the computing device clock 120 with the latency adjustment time by the microprocessor 105.

Referring to FIG. 8, sometime after the start-of-the-fixed-time interval $Tn_0$ at the time instant $txn_0$ denoted 180, a first zero-crossing synchronized command 111 is issued. At the time instant 182, the first zero-crossing synchronized command 111 enters the communications link 114. It reaches the microprocessor 107 at the time instant 188. The microprocessor 107 does not immediately respond; instead, it awaits the next zero-crossing denoted as the start-of-the-fixed-time interval $Tn_1$ in FIG. 7.

At the start of the start-of-the-fixed-time interval $Tn_1$, the microprocessor 107 causes a first time-data signal 109 to be issued. After the master clock latency contribution $d_2$, the communications link latency contribution $d_1$ and the computing device latency $d_0$, the first time-data signal 109 is received by the microprocessor 105 at the time instant 196 and the computing device clock 120 updated with the latency adjusted time at the time instant 198. Thus, at the time instant 198, the microprocessor 105 synchronizes the computing device clock 120 as described above using the time indicated in the first time-data signal (indicating a start-of-a-fixed-time interval) plus the calculated clock-to-device latency aa/2.

As discussed above, the interval period of synchronization (e.g., hourly, daily, etc.) is established via user selected synchronization parameters and the resulting configuration information file. When received by the microprocessor 105, the user selected synchronization parameters in the configuration information file are used by the microprocessor 105 to set the service timer 230. Referring again to FIG. 4, upon application of the latency adjusted time to the computing device clock 120, the microprocessor 105 determines whether the method for providing accurate time generation in the computing device 104 is completed (decision step 322) based on the user selected synchronization settings. For example, if the user selected synchronization setting is the One Time setting 214, the method for providing accurate time generation in the computing device 104 is completed, whereas if the user selected synchronization setting is the Every Hour setting 234, the method for providing accurate time generation in the computing device 104 is not completed.

If the microprocessor 105 determines that the method for providing accurate time generation in the computing device 104 is not completed, it will determine whether the service timer 230 has expired or timed-out (decision step 323). If it is determined that the service timer 230 has not expired, the microprocessor 105 will wait. If it is determined that the service timer 230 has expired, the microprocessor 105 will determine whether clock-to-device latency aa/2 has to be recalculated (decision step 324).

If it is determined that the clock-to-device latency aa/2 does not have to be recalculated, the microprocessor 105 will cause one or more zero-crossing synchronized command 111 to be issued (step 316) as described above for purposes of re-synchronizing the computing device clock 120 using the new time indicated in a corresponding time-data signal 109 plus the previously calculated clock-to-device latency aa/2. If it is determined that the clock-to-device latency aa/2 has to be recalculated, the microprocessor 105 will re-start the latency timer 237 (step 304) and cause another series of loop-back commands command 108 to be issued for purposes of computing a new clock-to-device latency aa/2. The method steps will continue as described above.

The present method may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

In one embodiment, the logical operations of the present method are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for providing accurate time generation in a computing device, the system comprising:
   the computing device including a computing device clock and a first microprocessor operatively coupled to the computing device clock; and
   a master clock device operatively coupled to the computing device via a communications link, the master clock device including a master clock and a second microprocessor operatively coupled to the master clock, the master clock configured to provide a master clock output,
   wherein the first microprocessor is configured to synchronize a time of the computing device clock to the master clock output to provide the accurate time generation in the computing device using a latency adjusted time derived from a total system latency of the system;
   wherein the first microprocessor is further configured to:
      determine the total system latency based on a delay incurred between issuance of a first command by the first microprocessor and receipt of a first time-data signal by the first microprocessor, the first time-data signal representative of the master clock output at a first time and caused to be transmitted by the second microprocessor in response to receipt of the first command; and
      derive an accurate time from a second time-data signal, the second time-data signal representative of the master clock output at a second time and caused to be transmitted by the second microprocessor at a time instant known by the first microprocessor in response to receipt of a second command caused to be transmitted by the first microprocessor.

2. The system of claim 1, wherein the master clock device further comprises:

an antenna operatively coupled to the second microprocessor and configured to receive accurate time indications, the master clock output based on the accurate time indications; and a communications port operatively coupled to the second microprocessor and the communications link.

3. The system of claim 2, wherein the accurate time indications comprise global positioning system signals.

4. The system of claim 2, wherein the communications port and the communications link are configured for serial binary data communication.

5. The system of claim 1, wherein the master clock device further comprises a communications port operatively coupled to the second microprocessor and the communications link.

6. The system of claim 1, wherein the master clock output is based on accurate time indications provided to the master clock device.

7. The system of claim 6, wherein the accurate time indications are selected from the group consisting of microwave amplification by stimulated emission of radiation signals, light amplification by stimulated emission of radiation signals, cesium-based signals, and rubidium-based signals.

8. The system of claim 1, wherein the computing device further comprises a graphical user interface operatively coupled to the first microprocessor and configured to enable user selection of synchronized settings, the user selected synchronized settings included in a configuration information file.

9. The system of claim 8, wherein the first microprocessor is further configured to utilize the configuration information file to establish an interval period of providing the accurate time generation in the computing device.

10. The system of claim 9, wherein the computing device further comprises a service timer to indicate the interval period identified via the user selected synchronized settings.

11. The system of claim 8, wherein the synchronized settings are selected from the group consisting of a Disabled setting, a One Time setting, an Every Minute setting, an Every Hour setting, an Every Day setting, and a When Error Exceeds Epsilon setting.

12. The system of claim 1, wherein the first microprocessor is further configured to:

adjust the accurate time based on a percentage of the total system latency to form the latency adjusted time; and apply the latency adjusted time to the computing device clock to synchronize the time of the computing device clock to the master clock output.

13. The system of claim 12, further comprising a latency timer initiating a latency timer period prior to issuance of the first command and terminating the latency timer period subsequent to receipt of the first time-data signal, the latency timer period utilized to determine the total system latency.

14. The system of claim 12, wherein the first microprocessor is further configured to:

parse the second time-data signal; and apply a local time zone calculation to the parsed second time-data signal to derive the accurate time.

15. The system of claim 12, wherein the accurate time comprises a numeric calendar date expressed in an International Organization for Standardization format 8601.

16. The system of claim 12, wherein the first command comprises a loop-back command to invoke substantially immediate transmission of the first time-data signal, and wherein the second command comprises a zero-crossing synchronized command to invoke transmission of the second time-data signal at the time instant known by the first microprocessor.

17. The system of claim 12, wherein the time instant known by the first microprocessor comprises a zero-crossing mark of a one second interval of the master clock output.

18. The system of claim 1, wherein the total system latency comprises an average of a plurality of calculated total system latencies.

19. The system of claim 1, wherein a percentage of the total system latency comprises one-half of the total system latency.

20. The system of claim 1, wherein the total system latency is a sum of a first latency contribution due to computing device operation at a first time, a second latency contribution due to communications link operation at a second time, a third contribution due to master clock device operation at a third time, a fourth latency contribution due to master clock operation at a fourth time, a fifth latency contribution due to communications link operation at a fifth time and a sixth latency contribution due to computing device operation at a sixth time.

21. The system of claim 20, wherein the percentage of the total system latency includes the first latency contribution, the second latency contribution and the third contribution.

22. The system of claim 20, wherein the percentage of the total system latency includes the fourth latency contribution, the fifth latency contribution and a sixth latency contribution.

23. The system of claim 1, wherein the computing device is included in a power system.

24. A system for providing accurate time generation in a computing device, the system comprising:

the computing device including a computing device clock and a first microprocessor operatively coupled to the computing device clock; and a master clock device operatively coupled to the computing device via a communications link, the master clock device including a master clock and a second microprocessor operatively coupled to the master clock, the master clock configured to provide a master clock output, wherein the first microprocessor is configured to synchronize a time of the computing device clock to the master clock output to provide the accurate time generation in the computing device using a latency adjusted time derived from a total system latency of the system, the total system latency including a sum of a first latency contribution due to computing device operation at a first time, a second latency contribution due to communications link operation at a second time, a third contribution due to master clock device operation at a third time, a fourth latency contribution due to master clock operation at a fourth time, a fifth latency contribution due to communications link operation at a fifth time and a sixth latency contribution due to computing device operation at a sixth time, the total system latency being based on a delay incurred between issuance of a first command by the first microprocessor and receipt of a first time-data signal by the first microprocessor, the first time-data signal representative of the master clock output at a first time and caused to be transmitted by the second microprocessor in response to receipt of the first command;

the first microprocessor further configured to derive an accurate time from a second time-data signal, the second time-data signal representative of the master clock output at a second time and caused to be transmitted by the second microprocessor at a time instant known by the first microprocessor in response to receipt of a second command caused to be transmitted by the first microprocessor.

25. A method for providing accurate time generation in a computing device, the computing device including a computing device clock and a first microprocessor operatively coupled to the computing device clock, the method comprising:

- determining a total system latency based on a delay incurred between issuance of a first command by the first microprocessor and receipt of a first time-data signal by the first microprocessor, the first time-data signal representative of a master clock output of a master clock device at a first time;
- deriving an accurate time from a second time-data signal, the second time-data signal representative of the master clock output at a second time known by the first microprocessor;
- adjusting the accurate time based on a percentage of the total system latency to form a latency adjusted time; and
- applying the latency adjusted time to the computing device clock to synchronize a time of the computing device clock to the master clock output.

26. The method of claim 25, wherein the first time-data signal is caused to be transmitted by a second microprocessor of the master clock device in response to receipt of the first command, and wherein the second time-data signal is caused to be transmitted by the second microprocessor at the second time in response to receipt of a second command caused to be transmitted by the first microprocessor.

27. The method of claim 26, wherein the first command comprises a loop-back command to invoke substantially immediate transmission of the first time-data signal, and wherein the second command comprises a zero-crossing synchronized command to invoke transmission of the second time-data signal at the second time.

28. The method of claim 25, wherein the second time comprises a zero-crossing mark of a one second interval of the master clock output.

29. The method of claim 25, wherein the master clock output is based on accurate time indications provided to the master clock device.

30. The method of claim 29, wherein the accurate time indications are selected from the group consisting of global positioning system signals, microwave amplification by stimulated emission of radiation signals, light amplification by stimulated emission of radiation signals, cesium-based signals, and rubidium-based signals.

31. The method of claim 25, further comprising enabling user selection of synchronized settings via a graphical user interface operatively coupled to the first microprocessor, the user selected synchronized settings included in a configuration information file.

32. The method of claim 31, further comprising utilizing the configuration information file to establish an interval period of providing the accurate time generation in the computing device.

33. The method of claim 31, wherein the synchronized settings are selected from the group consisting of a Disabled setting, a One Time setting, an Every Minute setting, an Every Hour setting, an Every Day setting, and a When Error Exceeds Epsilon setting.

34. The method of claim 25, further comprising initiating a latency timer period prior to issuance of the first command and terminating the latency timer period subsequent to receipt of the first time-data signal, the latency timer period utilized to determine the total system latency.

35. The method of claim 25, further comprising:
parsing the second time-data signal; and
applying a local time zone calculation to the parsed second time-data signal to form the accurate time.

36. The method of claim 25, wherein the accurate time comprises a numeric calendar date expressed in an International Organization for Standardization format 8601.

37. The method of claim 25, wherein the total system latency comprises an average of a plurality of calculated total system latencies.

38. The method of claim 25, wherein the percentage of the total system latency comprises one-half of the total system latency.

39. The method of claim 25, wherein the total system latency is a sum of a first latency contribution due to computing device operation at a first time, a second latency contribution due to communications link operation at a second time, a third contribution due to master clock device operation at a third time, a fourth latency contribution due to master clock operation at a fourth time, a fifth latency contribution due to communications link operation at a fifth time and a sixth latency contribution due to computing device operation at a sixth time.

40. The method of claim 39, wherein the percentage of the total system latency includes the first latency contribution, the second latency contribution and the third contribution.

41. The method of claim 39, wherein the percentage of the total system latency includes the fourth latency contribution, the fifth latency contribution and a sixth latency contribution.

42. The method of claim 25, wherein the computing device is included in a power system.

43. A method for providing accurate time generation in a computing device of a power system, the computing device including a computing device clock and a first microprocessor operatively coupled to the computing device clock, the method comprising:

(a) receiving a first plurality of time-data signals, receipt of each of the first plurality of time-data signals corresponding to issuance and transmission of a respective loop-back command of a plurality of loop-back commands;

(b) determining an averaged total system latency based on an averaged delay incurred between issuance of each of the plurality of loop-back commands and receipt of each of the corresponding first plurality of time-data signals;

(c) receiving a second plurality of time-data signals, each of the second plurality of time-data signals transmitted at a different known time instant in response to receipt of at least one zero-crossing synchronized command;

(d) deriving an accurate time from at least one of the second plurality of time-data signals;

(e) adjusting the accurate time based on a percentage of the averaged total system latency to form a latency adjusted time; and (f) applying the latency adjusted time to the computing device clock to synchronize a time of the computing device clock to a master clock output of a master clock device.

44. The method of claim 43, wherein each of the different known time instants comprise a zero-crossing mark a different one second interval of the master clock output.

45. The method of claim 43, wherein the master clock output is based on global positioning system signals.

46. The method of claim 43, wherein each of the first plurality of time-data signals is transmitted from the master clock device substantially immediately in response to receipt of a respective loop-back command of the plurality of loop-back commands, and wherein each of the second plurality of time-data signals is transmitted from the master clock device at a respective different known time instant in response to receipt of the at least one zero-crossing synchronized command.

47. The method of claim 43, wherein the plurality of loop-back commands and the at least one zero-crossing synchronized command are caused to be issued and transmitted by the first microprocessor.

48. The method of claim 43, further comprising detecting an indication of an interval period prior to issuance of a first loop-back command of the plurality of loop-back commands.

49. The method of claim 48, further comprising utilizing a configuration information file to establish the interval period, the configuration information file including user selected synchronized settings.

50. The method of claim 49, wherein the synchronized settings are selected from the group consisting of a Disabled setting, a One Time setting, an Every Minute setting, an Every Hour setting, an Every Day setting, and a When Error Exceeds Epsilon setting.

51. The method of claim 43, wherein the accurate time comprises a numeric calendar date expressed in an International Organization for Standardization format 8601.

52. The method of claim 43, wherein the percentage of the total system latency comprises one-half of the averaged total system latency.

53. The method of claim 43, wherein the total system latency is a sum of a first latency contribution due to computing device operation at a first time, a second latency contribution due to communications link operation at a second time, a third contribution due to master clock device operation at a third time, a fourth latency contribution due to master clock operation at a fourth time, a fifth latency contribution due to communications link operation at a fifth time and a sixth latency contribution due to computing devise operation at a sixth time.

54. The method of claim 43, wherein the percentage of the total system latency includes the first latency contribution, the second latency contribution and the third contribution.

\* \* \* \* \*

UNITED STATES PATENT AND TRADEMARK OFFICE
CERTIFICATE OF CORRECTION

PATENT NO. : 7,617,408 B2
APPLICATION NO. : 11/353714
DATED : November 10, 2009
INVENTOR(S) : Frazier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Nineteenth Day of October, 2010

David J. Kappos
*Director of the United States Patent and Trademark Office*